(12) United States Patent
Trejo

(10) Patent No.: US 7,631,750 B2
(45) Date of Patent: Dec. 15, 2009

(54) APPARATUS FOR AND METHOD OF ARRANGING BAKERY PRODUCTS

(75) Inventor: Joaquin Alverde Trejo, Municipio de Metepec (MX)

(73) Assignee: Grupo Bimbo, S.A.B. de C.V., Mexico City (MX)

( * ) Notice: Subject to any disclaimer, the term of this patent is extended or adjusted under 35 U.S.C. 154(b) by 150 days.

(21) Appl. No.: 12/029,984

(22) Filed: Feb. 12, 2008

(65) Prior Publication Data

US 2009/0200138 A1 Aug. 13, 2009

(51) Int. Cl.
*B65G 13/02* (2006.01)
*B65G 47/244* (2006.01)

(52) U.S. Cl. .................. 198/786; 198/780; 198/394; 198/382

(58) Field of Classification Search ......... 198/780–791, 198/373, 383, 389, 394, 382
See application file for complete search history.

(56) References Cited

U.S. PATENT DOCUMENTS

| | | | | |
|---|---|---|---|---|
| 2,860,766 A | * | 11/1958 | Welter | 198/780 |
| 3,471,002 A | * | 10/1969 | Levin et al. | 198/782 |
| 4,422,543 A | * | 12/1983 | Stubbings | 198/782 |
| 6,370,447 B1 | * | 4/2002 | Miyazaki | 700/230 |
| 7,318,304 B2 | * | 1/2008 | Hiddink et al. | 53/246 |
| 2007/0125239 A1 | | 6/2007 | Balleza et al. | |

* cited by examiner

*Primary Examiner*—Mark A Deuble
(74) *Attorney, Agent, or Firm*—Fish & Richardson P.C.

(57) ABSTRACT

An apparatus for longitudinally arranging elongated items may include a plurality of parallel rotatable members having at least two radially enlarged portions and a channel portion disposed between adjacent radially enlarged portions. The rotatable members are disposed transverse to the desired longitudinal arrangement. The apparatus may also include a drive mechanism coupled to at least one of the rotatable members. Longitudinally arranging items, such as bakery products having an elongated shape, may be accomplished by receiving a plurality of items that are randomly oriented, introducing the plurality of items into at least one longitudinal channel formed by a plurality of channels portions on parallel rotating members, conveying the items along the at least one channel, narrowing a width of the at least one channel while conveying the items, aligning the items within the at least one channel, and outputting at least one row of longitudinally aligned items.

22 Claims, 5 Drawing Sheets

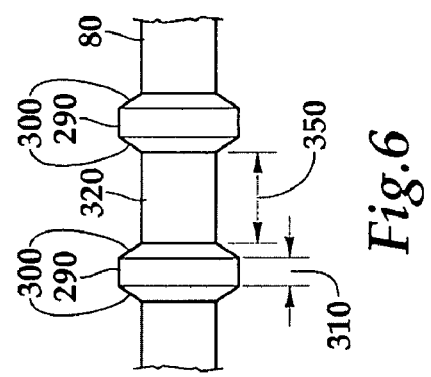
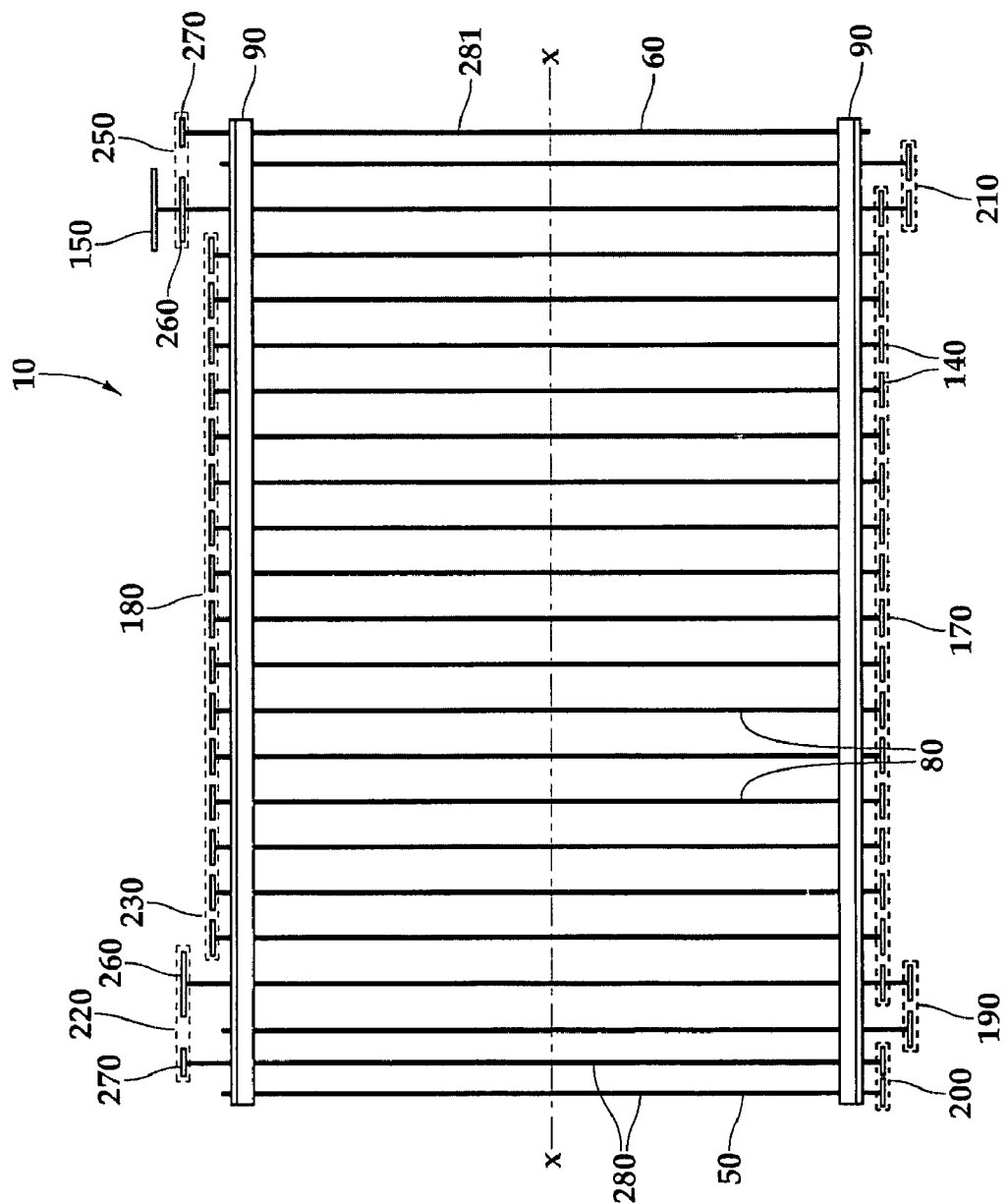

APPARATUS FOR AND METHOD OF ARRANGING BAKERY PRODUCTS

TECHNICAL FIELD

The present disclosure relates to arranging items, and more particularly to aligning elongated bakery products into one or more rows.

BACKGROUND

Conveying systems are used to transport items from one location to another. In some applications, the transportation systems may be used to transport and align elongated products between processing operations during production.

SUMMARY

The present disclosure relates to arranging items. One aspect encompasses an apparatus for longitudinally arranging elongated items including a plurality of rotatable members disposed transverse to a longitudinal axis of the apparatus having at least two radially enlarged portions and a channel portion disposed between adjacent radially enlarged portions. The apparatus may also include a first drive member coupled to a first rotatable member of the plurality of rotatable member and a drive member coupled to the first rotatable member and a second rotatable member of the plurality of rotatable members.

Another aspect encompasses a method for arranging elongated bakery products in a longitudinal direction receiving a plurality of items that are randomly oriented, including introducing longitudinally a plurality of the elongated bakery products at a first end of an apparatus having a plurality of parallel rotatable members disposed transverse to the longitudinal direction, each rotatable member having a plurality of radially enlarged portions with a channel portion disposed therebetween, rotating the plurality of rotatable members, introducing the plurality of bakery products into at least one longitudinal channel formed by at least two longitudinally aligned channel portions of ht plurality of rotatable members, conveying the plurality of items along the at least one channel, narrowing a width of the at least one channel while longitudinally conveying the plurality of items, aligning the plurality of items within the at least one longitudinal channel, and outputting at least one row of longitudinally aligned items.

A further aspect encompasses an apparatus for longitudinally aligning a plurality of elongated products including a plurality of rotatable member disposed transverse to a longitudinal axis of the apparatus and adjacent to each other to form a row, each of the plurality of rotatable members having a plurality of radially enlarged portions and channel portions disposed between adjacent radially enlarged portions. The radially enlarged portions may have sloped sidewalls. The apparatus may also include a plurality of channels formed along a length of the apparatus formed by aligned channel portions of adjacent rotatable members. Further, the apparatus may include at least one drive mechanism coupled to the plurality of rotatable members.

The various aspects may include one or more of the following features. The plurality of rotatable members may be arranged adjacent to each other to form a row and wherein corresponding channel portions of the rotatable members may be aligned to form at least one channel extending along the longitudinal axis of the apparatus for a length of the apparatus. A width of the radially enlarged portions of the plurality of rotatable members may progressively increase along the length of the apparatus so that a width of the at least one channel progressively narrows along the length of the apparatus. The at least one channel may be a plurality of channels. Axes of rotation of the plurality of rotatable members may be parallel. A drive mechanism may be coupled to the plurality of rotatable members via the first drive member. The first drive member may be a chain that engages at least a portion of the plurality of rotatable members via a sprocket disposed near an end of the plurality of rotatable members. The plurality of rotatable members may further include a sprocket disposed near an end of each of the plurality of rotatable members. The second drive member may engage at least a portion of the sprockets. A rotational speed of a first set of the plurality of rotatable members may be different from a rotational speed of a second set of the plurality of rotatable members. The plurality of rotatable members may be arranged into at least two groups. The rotatable members within each group may have channel portions with a constant width, and the width of the channel portions of different groups may be different. At least one of the first drive member or the second drive member may be a belt. The sprockets may be a pulley.

The various aspects may also include one or more of the following features. Aligning a plurality of items within at least one channel may include progressively aligning the items as the width of the at least one longitudinal channel narrows. The plurality of items may be accelerated to affect a longitudinal orientation of the plurality of items.

The various aspects may further include one or more of the following features. The plurality of channels may progressively narrow along the length of the apparatus. A drive mechanism may be coupled to the plurality of rotatable members via the plurality of drive members that engages a sprocket attached near an end of each rotatable member. The sprocket provided on each of the rotatable members may be a pulley. A plurality of rotatable members may be rotatably mounted on the support structure. The plurality of rotatable members may be arranged into at least two groups. The rotatable members within each group may have channel portions with a constant width, and the width of the channel portions of different groups may be different. A width of the radially enlarged portions of the plurality of rotatable members may progressively increase along the length of the apparatus so that a width of the at least one channel progressively narrows along the length of the apparatus.

The details of one or more implementations are set forth in the accompanying drawings and the description below. Other features, objects, and advantages will be apparent from the description and drawings, and from the claims.

DESCRIPTION OF DRAWINGS

FIG. 5 is a schematic view of a drive system for operating an example apparatus for arranging bakery products; and FIG. 6 is a partial detail view of a rotatable member of an example apparatus for arranging bakery products.

DETAILED DESCRIPTION

Arranging items may be accomplished as disclosed herein. Particularly, bakery products such as hot dog buns or other elongated bakery products may be aligned into one or more rows. Moreover, the one or more rows may be oriented parallel to each other. Although bakery products are used throughout the present disclosure, it is understood that other items may be arranged as described herein. Thus, the present disclosure is not limited to elongated bakery products. Rather, elongated bakery products are used merely as examples.

Figure 1:
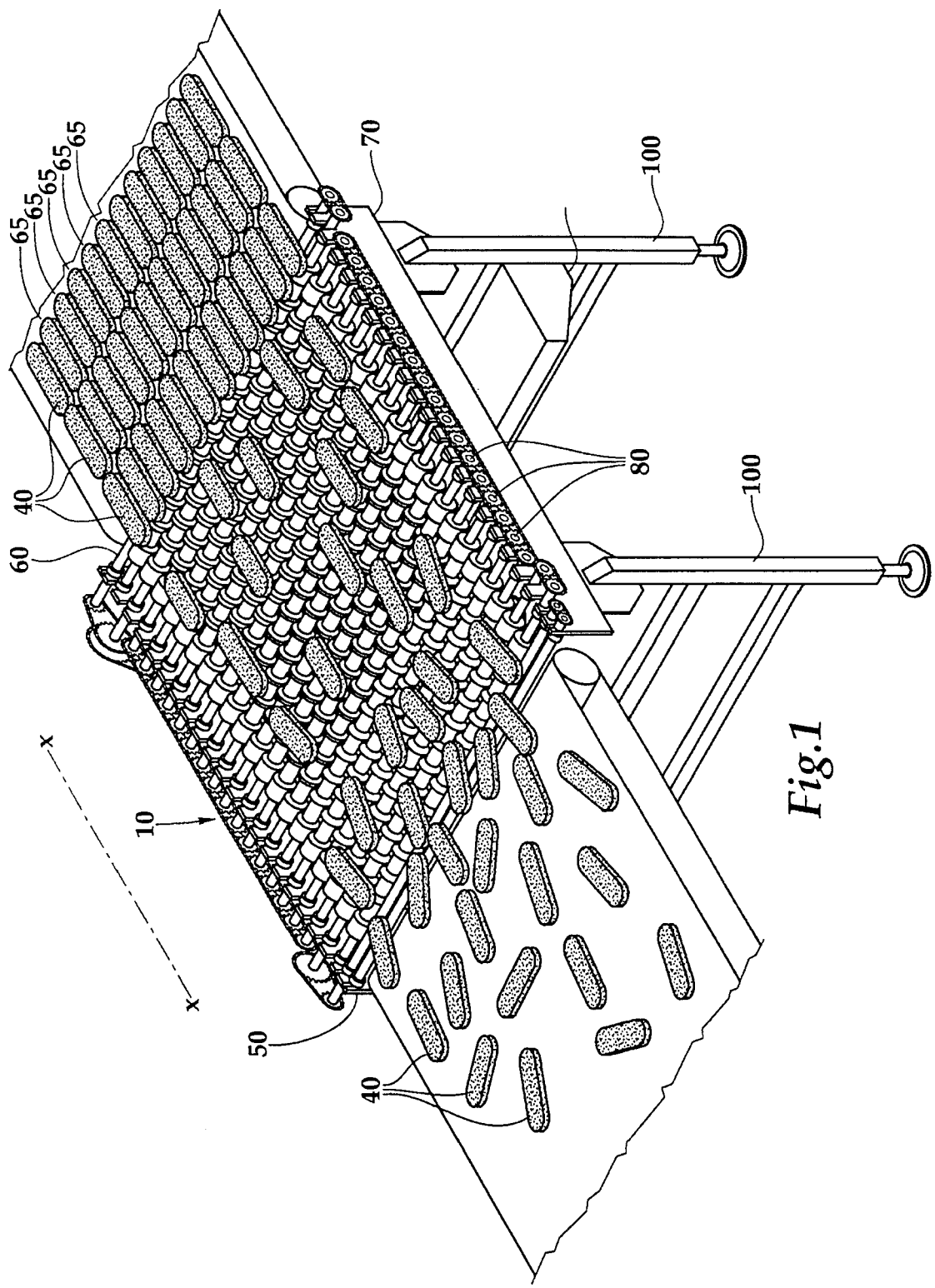
FIG. 1 is perspective view of an example conveying system for conveying bakery products.

FIGS. 1-4 show an example apparatus 10 for arranging elongated bakery products. The apparatus 10 may be disposed between product transport devices. For example, as shown in FIG. 1, the apparatus 10 may be disposed between a first conveyor 20 and a second conveyor 30. However, other product transport devices operable to transport one or more products may be used. Thus, the apparatus 10 may form a portion of a conveying system for both conveying and aligning a plurality of bakery products 40, particularly elongated bakery products. The plurality of bakery products 40 may be conveyed to the apparatus 10 at a first end 50 thereof by the first conveyor 20. The apparatus 10 may then deposit the aligned or substantially aligned bakery products 40 onto the second conveyor 30 disposed at a second end 60 of the apparatus 10. The bakery products 40 may be deposited onto the second conveyor 30 in one or more aligned rows 65. The second conveyor 30 may convey the bakery products 40 to a subsequent operation for further processing, such as packing of the bakery products 40, for example. Although the apparatus 10 is shown disposed between first and second conveyors 20 and 30, the apparatus 10 may be adjacent only one conveyor. Further still, the apparatus 10 may not be used directly adjacent to any conveyors.

The apparatus 10 may include a support structure 70 and a plurality of rotatable members 80 arranged transverse to a longitudinal axis X-X of the support structure 70. According to some implementations, the support structure 70 may include a pair of side members 90 and a pair of legs 100 extending from each of the side members 90. A brace member 110 may extend between adjacent legs 100 at the first end 50 of the apparatus 10 and between adjacent legs 100 at the second end 60 of the apparatus 10. The support structure 70 may also include a drive support 120 and drive source 130. According to some implementations, the drive source 130 may be an electric motor, a combustion engine, or any other device operable to drive the rotatable members 80. Still further, the drive source 130 of the apparatus 10 may be a gear, belt, shaft, or other mechanical or electrical device operable to provide power to the apparatus 10. The drive source 130 may be disposed on the drive support 120, below the plurality of rotatable members 80.

Figure 2:
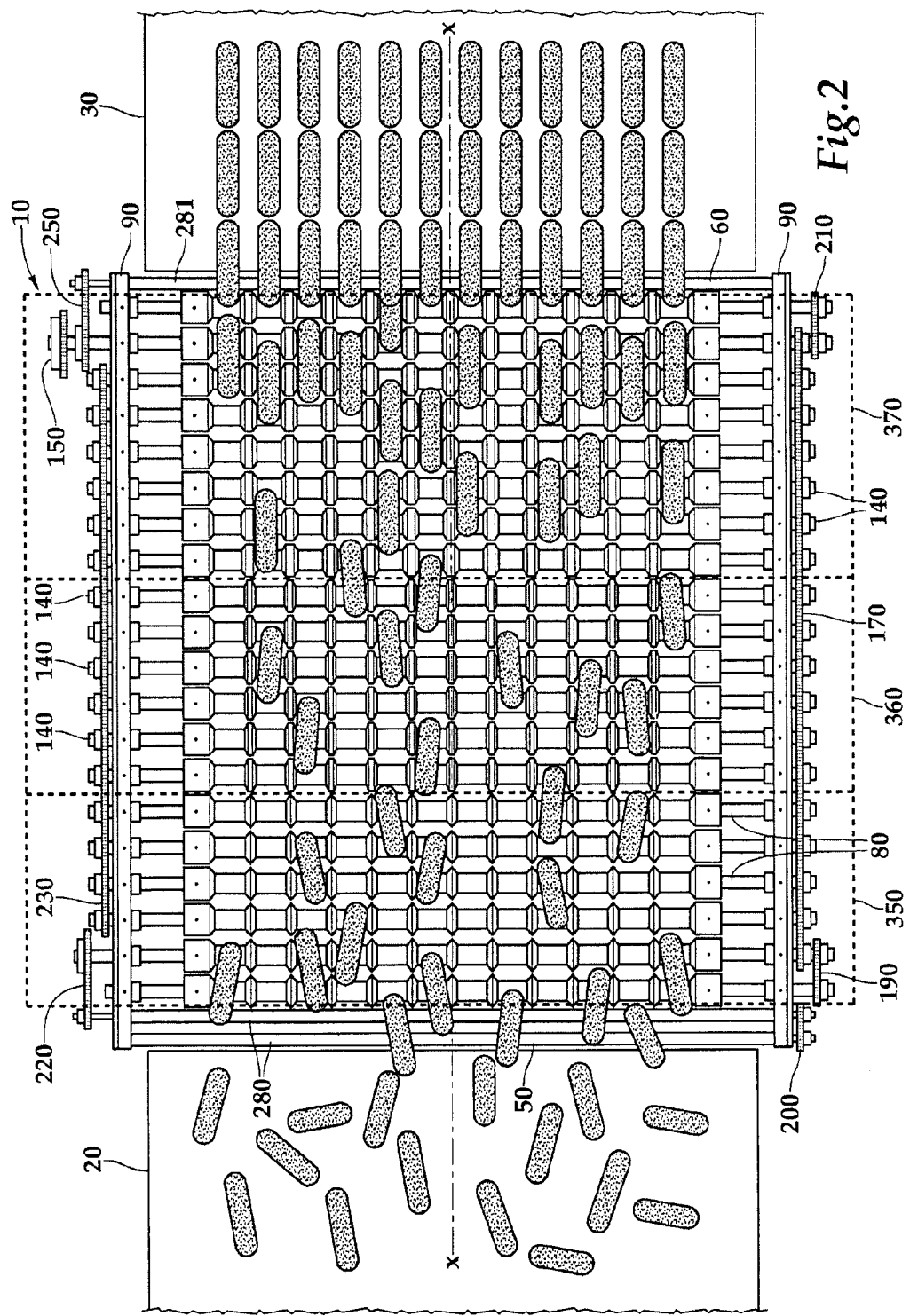
FIG. 2 is a top view of an example apparatus for conveying and aligning bakery products.
Figure 3:
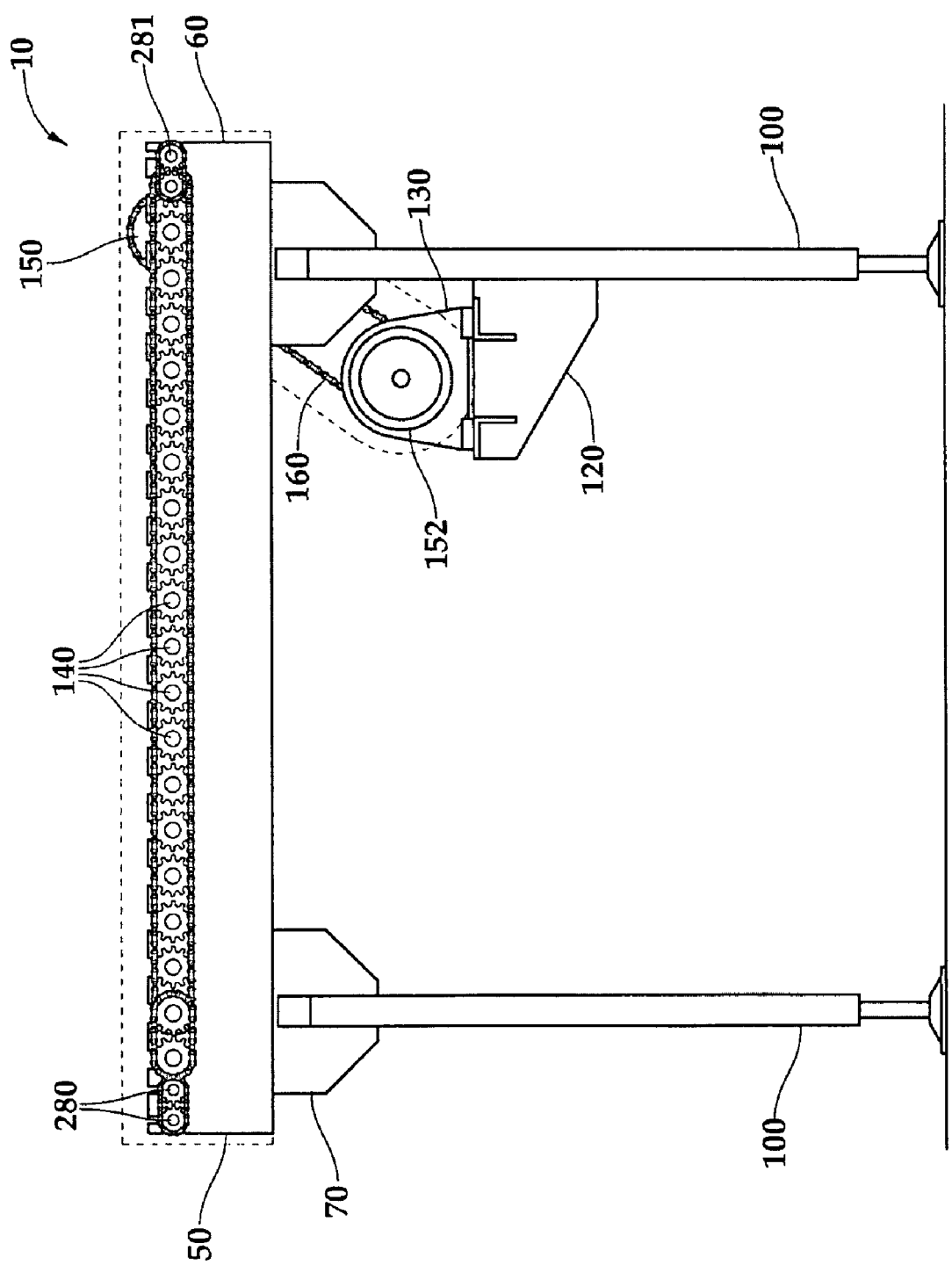
FIG. 3 is a side view of the apparatus of FIG. 2.
Figure 4:
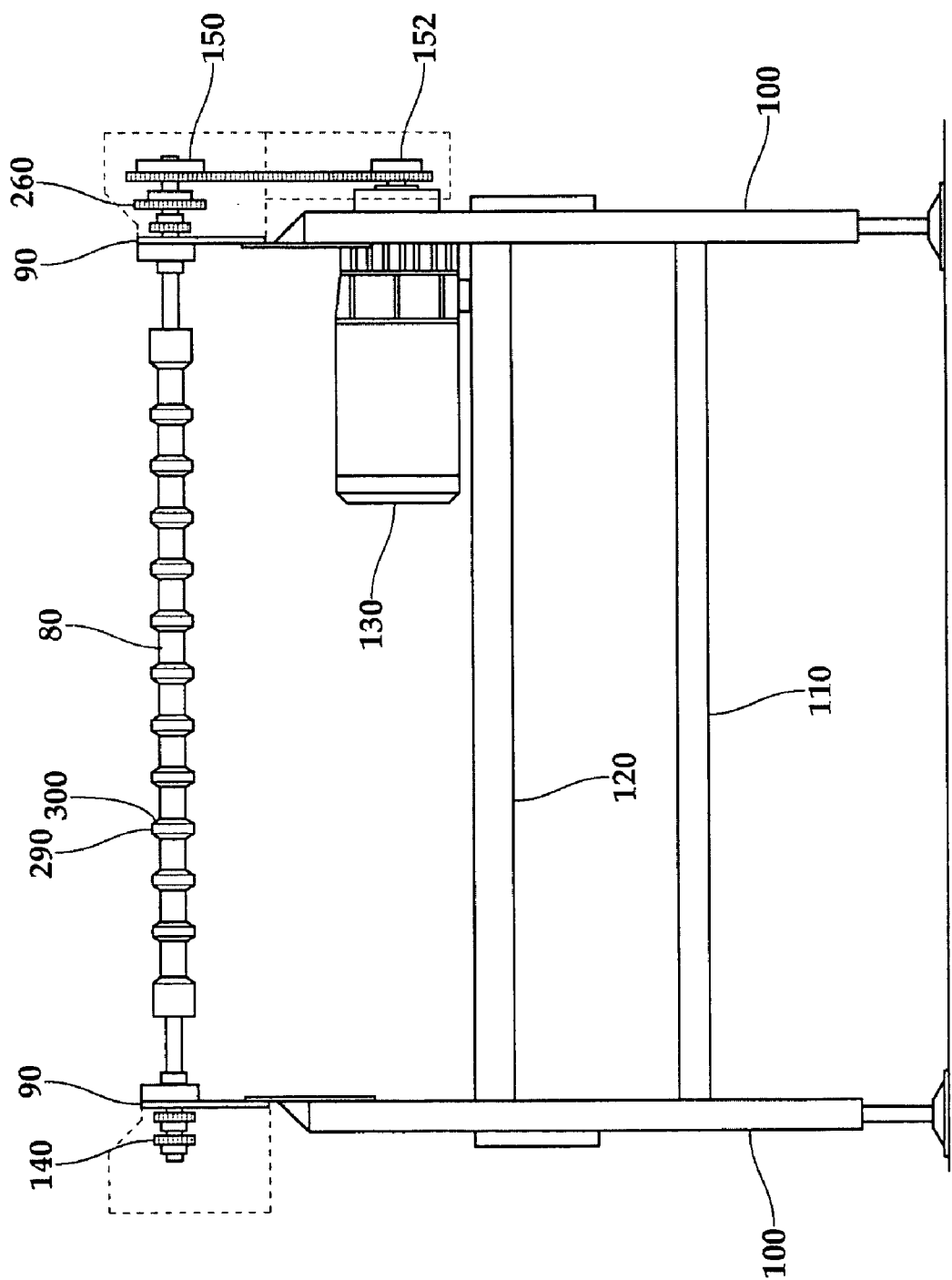
FIG. 4 is a cross sectional view along A-A of the apparatus of FIG. 2.

The rotatable members 80 extend between the side members 90. According to some implementations, the rotatable members 80 are disposed transversely or substantially transversely to the side members 90. However, the rotatable members 80 may be disposed at any angle relative to the side members 90. Further, the rotatable members 80 may rotate in bearings retained in or on the side members 90. Also, each rotatable member 80 may be include one or more sprockets 140. As shown in FIG. 2, some rotatable members 80 include a sprocket 140 at or near a single end thereof, while other rotatable members 80 include a sprocket 140 at or near opposing ends thereof Referring to the schematic shown in FIG. 5, at least one of the rotatable members 80 includes a drive sprocket 150. The drive sprocket 150 is coupled to a drive sprocket 152 of the drive source 130 via a first drive member 160. According to some implementations, the first drive member 160 may be a continuous belt, chain, or other member operable to drive one or more sprockets. It will be understood that pulleys configured to receive belts may be used instead of sprockets, and the present disclosure is not limited to use of sprockets to drive the rotatable members 80. The disclosure encompasses the use of pulleys and belts and other conventionally known drive systems.

When the drive source 130 is operated, the rotatable member 80 attached to the drive sprocket 150 is rotated. As shown in the example implementation, the rotatable member 80 to which the drive sprocket 150 is attached includes a sprocket 140 at an opposite end that is coupled to a second drive member 170. The second drive member 170 extends between a plurality of sprockets 140. The second drive member 170 transfers a rotation from the rotatable member 80 having the drive sprocket 150 to the other rotatable members 80 having sprockets 140 engaged by the second drive member 170. The second drive member 170 may be, for example, a belt, chain, or other member operable to drive one or more sprockets 140. Consequently, the first and second drive members 160 and 170 are operable to rotate a plurality of the rotatable members 80. Further, the implementations shown in FIGS. 1-5 are merely examples. Therefore, other implementations may include more or fewer rotatable members 80 driven by the second drive member 170.

A third drive member 180 may be provided along a plurality of the rotatable members 80 engaged by the second drive member 120 and may be disposed along ends of the rotatable members 80 opposite the second drive member 120. Although shown as engaging only a portion of the rotatable members 80 engaged by the second drive member 170, the third drive member 180 may engage all of the rotatable members 80 engaged by the second drive member 170. Still further, the third rotatable member 180 may engage other rotatable members 80 in addition to some or all of the rotatable members 80 engaged by the second drive member 170. The third drive member 180 engages a plurality of sprockets 140 attached to the rotatable members 80 and is operable to rotate the engaged rotatable members 80. The apparatus 10 may include additional drive members, such as drive members 190, 200, 210, 230, and 250, to rotate additional rotatable members 80 in a manner similar to that described above. The drive members 190, 200, 210, 220, 230, and 250 may be, for example, a belt, chain, or other member operable to drive one or more sprockets. Further, the drive members 160, 170, 180, 190, 200, 210, 220, 230, and 250 and the drive source 130 form a drive system operable to rotate the rotatable members 80.

As explained above, the apparatus 10 may include drive members 220 and 250, shown in FIG. 5. The drive members 220 and 250 are disposed between a first sprockets 260 and a second sprocket 270 attached to rotatable members 280. As shown, two rotatable members 280 are provided at the first end 50 of the apparatus 10 and a single rotatable member 280 is provided at the second end 60 of the apparatus. The rotatable members 280 at the first end 50 is coupled to the drive member 220, and the rotatable member 281 at the second end 60 is coupled to the drive member 250. More or fewer rotatable members 230 may be provided at the ends 50 and/or 60 of the apparatus 10.

The first sprockets 260 may be larger in diameter than the second sprockets 270. Therefore, the second sprockets 270 may rotate faster (i.e., rotating with a larger number of revolutions per minute (RPM)) than the first sprockets 260. Consequently, the rotatable members 280 may rotate faster than the rotatable members 80 attached to the first sprocket 260. As a result, when a bakery product 40 comes into contact with the rotatable members 230 proximal to the first end 50, an end of the bakery product 40 may be accelerated. The acceleration may impart a rotation to the bakery product 40, for example, to rotate the bakery product 40 within a horizontal plane, thereby placing the bakery product 40 into better alignment with the conveying direction of the apparatus 10. At the second end 60 of the apparatus 10, the increased speed of rotation of the rotatable member 280 may accelerate the bakery products 40 away from the apparatus 10 and onto the second conveyor 30 as the bakery products 40 exit the apparatus 10.

The apparatus 10 shown in FIGS. 1-5 represents merely one possible implementation. Accordingly, other implementations are encompassed within the scope of the present disclosure. For example, other implementations may include additional or fewer rotatable members, sprockets, drive members, and/or drive sources arranged in the same or different configurations in order to convey one or more bakery products. Accordingly, it is intended that the present disclosure encompass all such implementations.

Referring to FIGS. 2 and 6, each of the rotatable members 80 includes a plurality of radially enlarged portions 290 having sloped side walls 300 and a width 310. A channel portion 320 having a width 330 is formed between adjacent radially enlarged portions 290. The radially enlarged portions 320 of adjacent rotatable members 80 may be aligned or substantially aligned so that the channel portions 320 and sloped sidewalls 300 of adjacent rotatable members 80 form channels 340 extending between the first and second ends 50 and 60 of the apparatus 10. The channels 340 form pathways for conveying the bakery products 40. Although FIGS. 1-5 show the apparatus 10 in which the radially enlarged portions are directly aligned, according to other implementations, the radially enlarged portions may be offset from each other to form channels that are skewed from a direction perpendicular to a rotatable members. That is, the channels may not be parallel with a direction normal to the axis of rotation of the rotatable members.

The rotatable members 80 may be arranged, for example, so that the width 310 of the radially enlarged portions 290 may become progressively larger between the first and second ends 50 and 60 of the apparatus 10. Thus, the channels 340 may become increasingly narrow as the width 330 of the channel portions 320 decreases from the first end 50 to the second end 60. For example, as shown in FIG. 2, the rotatable members 80 may be arranged in one or more groups with the width 310 of the radially enlarged portions 290 varying between groups but constant within each group. As a result, each group of rotatable members 80 may include radially enlarged portions 290 that have a constant width 310 within each group but different between groups. As shown in FIG. 2, the rotatable members 80 are arranged in three separate groups 350-370. However, the apparatus 10 may include additional or fewer groups of the rotatable members 80. The radially enlarged portions 290 of the first group 350 may have the smallest width; the radially enlarged portions 290 of the second group 360 with the second largest width; and the radially enlarged portions 290 of the third group 370 may have the largest width. Alternately, each rotatable member 80 may have radially enlarged portions 290 with different widths 290 that increase progressively from the first end 50 to the second end 60 of the apparatus 10.

In operation, the plurality of bakery products 40 disposed on the first conveyor 20 approach the apparatus 10. The first conveyor 20 may convey the bakery products 40 from a previous processing station, such as a baking operation. Further, the bakery products 40 may have skewed or random orientations such that the bakery products 40 are not longitudinally aligned with the conveying direction. The bakery products 40 first engage the rotatable members 280, which may impart a torque to an end of a skewed elongated bakery product 40 to aid in aligning the bakery product 40 with the conveying direction, as explained above. However, one or more of the bakery products 40 may still have a skewed orientation relative to the conveying direction. As the bakery products 40 proceed, the bakery product 40 may contact a radially enlarged portion 290 of one of the rotatable members 80 provided at or near the first end 50 of the apparatus 10. If the bakery product 40 has an orientation skewed relative to the conveying direction, a first end of the bakery product may contact a sloped sidewall 300 of one of the radially enlarged portions 290. The sloped sidewall 300 may further act to align the bakery products 40 with the conveying direction. Thus, contact with the sloped wall 300 may cause the skewed bakery products 40 to become further aligned while also defining a particular channel 340 along which the bakery products 40 are conveyed. As the bakery products 40 continue along the length of the apparatus, the channels 340 narrow, which further directs the bakery product into a desired alignment.

At the second end 60 of the apparatus 10, the bakery products 40 may be removed onto the second conveyor 30, such as by an acceleration from the rotatable member 280. The bakery products 40 are removed onto the second conveyor 30 in a plurality of aligned or substantially aligned rows 65, illustrated in FIG. 1. The aligned bakery products 40 may then be conveyed to a next operation, such as packaging.

The various implementations described herein provide various benefits including, for example, providing uniform distribution of products, preventing or substantially reducing damage to the products while being conveyed and/or aligned, and maintaining an alignment of the products while being conveyed. Implementations may also be used to arrange products having a particular shapes. Additional benefits include continuously and smoothly aligning products (e.g., fragile products susceptible to damage), facilitating packaging as well as other processing operations (e.g., slicing) of the products, reducing and/or eliminating handling of the products by humans, and reducing manpower and/or costs associated with aligning the products.

A number of implementations have been described. Nevertheless, it will be understood that various modifications may be made without departing from the spirit and scope of the present disclosure. Accordingly, other implementations are within the scope of the following claims.

What is claimed is:

1. An apparatus for longitudinally arranging elongated items comprising:
   a plurality of rotatable members disposed transverse to a longitudinal axis of the apparatus comprising:
     at least two radially enlarged portions; and
     a channel portion disposed between adjacent radially enlarged portions;
   a first drive member coupled to a first rotatable member of the plurality of rotatable members; and
   a second drive member coupled to the first rotatable member and a second rotatable member of the plurality of rotatable members, wherein the plurality of rotatable members are arranged adjacent to each other to form a row and wherein corresponding channel portions of the rotatable members are aligned to form at least one channel extending along the longitudinal axis of the apparatus for a length of the apparatus.

2. The apparatus of claim 1, wherein a width of the radially enlarged portions of the plurality of rotatable members progressively increases along the length of the apparatus so that a width of the at least one channel progressively narrows along the length of the apparatus.

3. The apparatus of claim 1, wherein the at least one channel is a plurality of channels.

4. The apparatus of claim 1, wherein axes of rotation of the plurality of rotatable members are parallel.

5. The apparatus of claim 1 further comprising a drive mechanism coupled to the plurality of rotatable members via the first drive member.

6. The apparatus of claim 1, wherein the at least one drive member is a chain that engages at least a portion of the plurality of rotatable members via a sprocket disposed near an end of the plurality of rotatable members.

7. The apparatus of claim 1, wherein the plurality of rotatable members further comprises a sprocket disposed near an end of each of the plurality of rotatable members and wherein the second drive member engages at least a portion of the sprockets.

8. The apparatus of claim 1, wherein at least one of the first drive member or second drive member is a belt.

9. The apparatus of claim 7, wherein the sprockets are pulleys.

10. The apparatus of claim 1, wherein a rotational speed of a first set of the plurality of rotatable members is different from a rotational speed of a second set of the plurality of rotatable members.

11. The apparatus of claim 1, wherein the plurality of rotatable members are arranged into at least two groups, wherein the rotatable members within each group have channel portions with a constant width, and wherein the width of the channel portions of different groups is different.

12. The apparatus of claim 1, wherein the radially enlarged portions include sloped sidewalls.

13. A method for arranging elongated bakery products in a longitudinal direction comprising:
  receiving a plurality of elongated bakery products that are randomly oriented;
  introducing longitudinally a plurality of the elongated bakery products at a first end of an apparatus having a plurality of parallel rotatable members disposed transverse to the longitudinal direction, each rotatable member having a plurality of radially enlarged portions with a channel portion disposed therebetween;
  rotating the plurality of rotatable members;
  introducing the plurality of bakery products into at least one longitudinal channel formed by at least two longitudinally aligned channel portions of the plurality of rotatable members;
  conveying the plurality of items along the at least one channel;
  narrowing a width of the at least one channel while longitudinally conveying the plurality of items;
  aligning the plurality of items within the at least one longitudinal channel; and
  outputting at least one row of longitudinally aligned items.

14. The method of claim 13, wherein aligning the plurality of items within the at least one channel comprises progressively aligning the items as the width of the at least one longitudinal channel narrows.

15. The method of claim 13 further comprising accelerating the plurality of items to affect a longitudinal orientation of the plurality of items.

16. An apparatus for longitudinally aligning a plurality of elongated products comprising:
  a plurality of rotatable member disposed transverse to a longitudinal axis of the apparatus and adjacent to each other to form a row, each of the plurality of rotatable members comprising:
    a plurality of radially enlarged portions having sloped sidewalls; and
    channel portions disposed between adjacent radially enlarged portions;
  a plurality of channels formed along a length of the apparatus formed by aligned channel portions of adjacent rotatable members; and
  at least one drive mechanism coupled to the plurality of rotatable members.

17. The apparatus of claim 16, wherein the plurality of channels progressively narrow along the length of the apparatus.

18. The apparatus of claim 16 further comprising a plurality of drive members and a sprocket attached near an end of each rotatable member, wherein the drive mechanism is coupled to the plurality of rotatable members via the plurality of drive members that engage the sprockets.

19. The apparatus of claim 18, wherein the sprocket provided on each of the rotatable members is a pulley.

20. The apparatus of claim 16 further comprising a support structure, wherein the plurality of rotatable members are rotatably mounted on the support structure.

21. The apparatus of claim 16, wherein the plurality of rotatable members are arranged into at least two groups, wherein the rotatable members within each group have channel portions with a constant width, and wherein the width of the channel portions of different groups are different.

22. The apparatus of claim 16, wherein a width of the radially enlarged portions of the plurality of rotatable members progressively increases along the length of the apparatus so that a width of the at least one channel progressively narrows along the length of the apparatus.

* * * * *